United States Patent Office 3,198,858
Patented Aug. 3, 1965

3,198,858
PLASTER COMPOSITION AND METHOD
Waldemar C. Hansen, Valparaiso, Ind., and Joseph D. McNulty, Chicago, Ill., assignors to McNulty Bros. Company, Chicago, Ill., a corporation of Illinois
No Drawing. Filed May 27, 1964, Ser. No. 370,661
7 Claims. (Cl. 264—35)

This application is a continuation-in-part of our copending applications, Serial Nos. 194,190, filed May 11, 1962, and 216,745, filed August 24, 1962, both abandoned.

This invention relates to a plaster composition and method, and, more particularly, to a surfacing material which possesses superior trowelability.

The plasters with which the instant invention are concerned are those made up primarily of gypsum—as contrasted to the lime plaster employed historically.

Lime plasters conventionally are made up of three parts by volume of lime to one part of gypsum plaster. These lime plasters have been used widely for finish coats on interior walls, ceilings, etc. because of their ease of trowelability. Two significant disadvantages characterize the use of lime plaster—(1) it must be hand applied and (2) the resultant surface has a low compressive strength. The latter manifests itself in the form of low abrasion resistance—the compressive strength being only of the order of 400–500 p.s.i.

Although lime plaster can be sprayed, as a practical matter it is not even considered because of its toxicity—particularly in small rooms, closets and the like. Hence, the advantages of automation have not applied to trowel-finish plasters. On the other hand, the gypsum plasters provide a superior surfacing in terms of hardness, strength, etc., but their usage has been handicapped because of the difficulty in trowel finishing the surface. The addition of various agents normally expected to improve trowelability has not solved the problem, but, instead, has worsened it through upsetting the "set" and interfering with the bond needed between the plaster layer and the gypsum lath. This problem has been solved by the instant invention, and the provision of a novel plaster composition and methods of preparation and use thus constitute an important object of the invention.

More particularly the invention contemplates a non-toxic, substantially lime-free plaster which thereby avoids the drawback of the need for hand application. Further, the invention contemplates the use of substantial quantities of gypsum which provides a superior abrasion resistance—yielding compressive strengths of the order of 1500–1800 p.s.i. This is all done without suffering from the previous drawback of lack of trowelability in a substantially lime-free gypsum plaster.

Through the use of certain additives we achieve a gypsum plaster characterized by superior trowelability and further being high in compressive strength while nontoxic.

Another object of the invention is to provide a novel plaster composition which includes a finely divided plasticizing agent and a colloidal water-retentive agent to provide unexpected trowelability in the plaster but without the attendant disadvantages characteristic of prior expedients.

Other objects and advantages of the invention may be seen in the details set down in this specification.

In one embodiment of the invention, we employ a minor quantity of a finely-divided plasticizing agent such as insoluble soap intimately admixed with the gypsum plaster. The soap may be derived from natural resins such as rosin, or a fatty acid having 8 to 22 carbon atoms, with the cation moiety being provided by a multivalent metal base, aluminum, calcium, magnesium, etc. Because of the cost and ease of obtaining them, we prefer insoluble stearate soaps, and the preferred form of these is aluminum stearate. The minor amount employed is in the range of about 0.2% to about 1% based on the weight of the gypsum in the plaster. Best results are obtained with about 0.5%.

The insoluble soap is advantageously incorporated into the plaster mixture prior to the time the plaster is blended with water. In large scale operations, the dry plaster is introduced into the hopper of a spraying machine, and we find it more advantageous to disperse the insoluble soap in the plaster prior to the blending in the machine mixer. The intimate interblending of the plaster and soap is best achieved when small plaster quantities are used by suspending the soap on the plaster in a ball mill while the plaster is at room temperature. When larger plaster quantities are employed, temperatures of the order of 180° F. can be tolerated, whereby the soap can be added to the gypsum during grinding following calcination.

Gypsum products originate from the naturally occurring mineral, gypsum, which is the dihydrate of calcium sulfate ($CaSO_4 \cdot 2H_2O$). The processing consists essentially of crushing or grinding the gypsum ($CaSO_4 \cdot 2H_2O$) and then heating it sufficiently to drive off enough water to produce plaster of Paris, which is the hemihydrate of calcium sulfate $CaSO_4 \cdot \frac{1}{2}H_2O$).

When calcining at atmospheric pressure, water of crystallization is liberated violently as steam and the gypsum crystals are fractured. Atmospheric calcination, therefore, results in calcined gypsum particles, which are porous aggregates composed of clumps of colloidal hemihydrate crystals. By changes in the process of manufacture, it is possible to produce a modification known as alpha gypsum, which has the same chemical analysis as atmospheric calcined gypsum but markedly different physical properties. To obtain alpha gypsum, lumps of gypsum rock up to two inches in size are placed in an autoclave, steam pressure is applied, and the charge is calcined at approximately 250° F. with no accompanying agitation.

Such calcination under pressure and without agitation produces a uniformly dehydrated product having unbroken, comparatively large, dense, stubby-shaped crystals. Owing to the low water absorption of the non-porous crystals and to their smaller surface area, only about two-thirds as much water is required to produce a mix comparable in consistency to amospheric, or normally calcined, gypsum.

The trowelability is further enhanced by incorporating a further minor quantity, of the order of 5% to 20%, of a colloidal, water-retentive agent such as kaolin clay, bentonite clay, China clay, or diatomaceous earth. Such plate-like particle minerals are advantageously incorporated into the gypsum-soap dry mixture, with the optimum concentration being of the order of about 6% based on gypsum. In industrial operations, the clay and soap may be added to the gypsum during grinding.

After the fortified plaster has been applied, either by hawk and trowel, or most generally by machine, we find that troweling is considerably easier than utilizing unfortified plaster under the same conditions. In particular, there is no breaking of the bond of the plaster with the plaster lath, which usually has a gypsum core faced with paper liners. Further, the plaster layer during troweling does not detrimentally "tear" or "drag" on the trowel, nor is there present any of the undesirable "cat face" type perforate surface. "Cat faces" constitute readily visible surface imperfections in the final, troweled finish. Each imperfection is a slight crater of diameter and depth several times the largest plaster particle—usually the sand. With gypsum plaster layers of the order of 1/16" thick, recognizable cat faces may be as shallow as 1/64". These are substantially avoided in the practice of the invention to provide troweled surfaces substantially like those currently achieved through the use of lime putty and plaster.

Still further, there is provided a readily paintable "smooth" surface as contrasted to the undesirable coarse or grainy surface previously experienced when using gypsum plasters.

It is believed that specific examples of the invention will aid in the understanding thereof, and for that purpose the following are set down:

Example I

In this example, the preferred formulation was employed, with the best results.

2 oz. of aluminum stearate (commercial grade) were mixed with 5 lbs. of alpha gypsum in a ball mill, the mixing being carried out at room temperature. The mixing was performed for about 10 minutes, after which 1½ lbs. of kaolin clay (of South Carolina origin) were added with further mixing. Thereafter, the admixed alpha gypsum, aluminum stearate, and clay were placed in a dry mixing machine and brought to the final formulation by the addition of 20 lbs. additional of alpha gypsum, 25 lbs. of 70–20 sand, and 1.5 oz. of retarder. The 70–20 designation represents that the sand passes a 20 mesh screen but is retained on a 70 mesh screen.

The above-described mix was fluidized through the addition of 11 lbs. 10 oz. of water and mixed in a drum mixer, and then placed in the hopper of a plasticizing machine. The spraying apparatus was arranged to practice the procedure outlined in Lloyd H. Hobson Patent 3,035,940, issued May 22, 1962. In accordance with that procedure, accelerator, i.e., aluminum sulfate, is atomized and introduced into the pumped plaster mix as it issues from the nozzle of the spray gun. For the purpose of this example, the pump speed of the apparatus was set at "5"—this relating to the flow of plaster. The accelerator line valve was set at "3," which determines the amount of accelerator, and the air pressure used to atomize the liquid accelerator was set at 50 p.s.i.

The plaster stream was impinged upon two different surfaces, both of which included a gypsum core sandwiched between paper liners. Each panel was 4' x 8', and the plaster was sprayed on about 1/16" thick by an experienced plasterer. One panel was anchored to 1⅝" sheetmetal studs on 24" centers by sheetmetal screws. The other panel was unanchored.

The first troweling was performed about 10 minutes after spray application of the plaster, which would correspond approximately to the elapsed time for spraying one wall. At this point, the plaster is still relatively wet. The troweling was easily accomplished and provided a smooth surface—in the parlance of the trade, there was sufficient "fat" in the plaster for easy troweling. The second troweling was performed about 15 minutes after the first troweling and when the plaster was relatively firm to the touch, the second troweling being effective to eliminate any ridges left from the first troweling. The third and final troweling occurred 26 minutes after application and when the first set spots were visually detected.

The resultant surface was graded superior for the purpose of painting, being smooth to both the touch and vision, in particular, being characterized by an absence of cat faces.

Based on the foregoing, it will be seen that the minor proportion of the soap additives is of the order of 0.5% of the weight of the gypsum, i.e., 8 oz. per 100 lbs. of gypsum. In like fashion, the 1½ lbs. of kaolin clay used for 25 lbs. of gypsum corresponds to 6% clay based on the weight of gypsum.

As a control, the formulation above given but without the aluminum stearate and clay was prepared and sprayed on the same type of surface. Troweling attempted within five minutes resulted in a large number of cat faces so that the finish was unsatisfactory.

Example II

The procedure of Example I was followed specifically, but with the exception that twice the amount of aluminum stearate was employed—4 oz. of aluminum stearate for the 25 lbs. of alpha gypsum. The results of the troweling were identical, indicating that 1% soap was equally useful.

Example III

The procedure in this and the subsequent examples follows that set forth in example I, the variations from the Example I procedure residing in the insoluble soap and the clay. In other words, the pump setting, the valve setting, and the air pressure were all the same, and similar type surfaces were employed to receive the plaster stream. In certain of the examples, there was a slight variation in the amount of water employed, the actual amount of water being fixed by the master plasterer based on his experience in utilizing this type of equipment. This resulted in a slight variation in the set times, and the times set down hereinafter correspond to the appearance of the first "spot," indicating that at least in one area of the surface the gypsum had crystallized. In each case, however, the same three trowelings were performed, and the last troweling being performed at the time the "spot" occurred.

In this example, the procedure of Example I was followed, with the exception that the 1½ lbs. of kaolin clay were omitted. The amount of water added was 10 lbs. 10 oz., and the first "spot" appeared at 23 minutes. The trowelability was found to be somewhat inferior to that provided by the formulations of Examples I and II because of lack of "fat" in the plaster layer. However, the plaster layer retained sufficient water to permit fair quality troweling.

Example IV

In this example, the procedure of Example I was followed, except for the omission of the aluminum stearate. In other words, the clay was present, so that comparison of Examples I, III and IV illustrates the advantages of the two ingredients. In this example, 11 lbs. 10 oz. of water were used and the first "spot" was seen at 27 minutes. Trowelability was poor, and the material was found to be very hard to trowel, ostensibly because of a lack of water.

Example V

In this example, the procedure of Example IV was followed in that no aluminum stearate was employed, but a larger amount of kaolin clay was employed. Here, 2½ lbs. of kaolin clay were used in place of the 1½ lbs. of Example IV. 12 lbs. 10 oz. of water were added, and the first "spot" occurred at 25 minutes. The first troweling went well, but there was insufficient water to make feasible the second troweling, so that the resultant surface was inadequate.

Example VI

Here, the process of Example I was followed, except that only 4 lbs. of kaolin clay were employed, with the result that the troweling was more difficult, the mixture lacking sufficient "fat."

Example VII

In this example, 1 lb. 8 oz. of bentonite clay (Wyoming) were employed in place of the corresponding quantity of kaolin clay used in Example I. The formulation also included 2 oz. of aluminum stearate. 11 lbs. 10 oz. of water were used, and the first spot was seen at 22 minutes. The troweling quality was somewhat inferior to that found in Example I, but superior to the examples where clay alone was used.

Example VIII

The procedure here followed the procedure of Example VII, but instead of the bentonite clay, 1 lb. 8 oz. of No. 1 ball clay (Tennessee) were used. 1¾ oz. of retarder were employed instead of the 1½ oz. used in the other examples, and 11 lbs. 10 oz. of water were added to the dry mix. The first spot set in 31 minutes, and the troweling went well on the first troweling, but there was insufficient "fat" in the mix to fill in the scratches and cat faces.

Example IX

In this test, 1½ lbs. of old mine No. 4 clay (Kentucky ball clay) were used in place of the kaolin clay of Example I. 1¾ oz. of retarder were employed, along with 11 lbs. 10 oz of water. The first spot set in 30 minutes, and the results here were identical to those in Example I.

Example X

In this example, 2 oz. of magnesium stearate were employed in place of the 2 oz. of aluminum stearate of Example I. With 1¾ oz. of retarder and 11 lbs. 10 oz. of water, the first spot set in 34 minutes. Magnesium stearate and aluminum stearate appear to be equivalents for the purpose of the invention. The test of this Example resulted in a finish lacking cat faces.

Example XI

Here, 2 oz. of aluminum palmitate were employed in place of the 2 oz. of aluminum stearate of Example I. With 1¾ oz. of retarder and 11 lbs. 10 oz. of water, the first spot set in 34 minutes. The plaster troweled poorly on first troweling, and required extra effort to acquire a finish. The initial troweling resulted in a rather coarse finish and a somewhat grainy appearance and considerably more pressure was required on the troweling during the second and third trowelings.

Example XII

In this example, the procedure of Example I was followed, with the exception that ¾ oz. of aluminum stearate were employed in place of the 2 oz. of Example I. This corresponded to .19% insoluble soap based on gypsum, and the trowelability was found to be poor. In order to achieve any finish, the troweling had to be performed within 5 minutes, which is inadequate for commercial operation.

A further test was run to confirm the lower effective limit of the insoluble soap. Again, the procedure of Example I was followed except that the weight of aluminum stearate constituted 0.25% of the weight of gypsum. This mix troweled satisfactorily. From this we conclude that the lower effective limit is of the order of 0.20% insoluble soap.

Example XIII

The procedure of Example X was followed, but with the 2 oz. of magnesium stearate reduced to ¾ oz., and the results were commercially unacceptable, paralleling the results of Example XII with the lower quantity of aluminum stearate.

Example XIV

In this example, gauging plaster was employed in place of the alpha gypsum employed in the previous examples. The gauging plaster is a ground gypsum normally intended for use in a finish coat when compounded with lime putty. A trowelable finish was obtained with 18 lbs. of kaolin clay, the other additives and conditions being the same as in Example I.

Example XV

In this example, "neat" cement plaster was employed in place of the alpha gypsum of Example I, all other additives and conditions being the same. The "neat" cement plaster is normally employed with sand or other aggregate to provide a base coat. The finish achieved here was similar in trowelability to that achieved with the formulation of Example I.

Example XVI

In this example, a combination of "neat" and alpha gypsums were employed. 30 lbs. of alpha gypsum and 20 lbs. of "neat" gypsum were employed in combination with 15 lbs. of 70–20 sand, 6 lbs. of kaolin clay, 4 oz. of stearate, 4.8 oz. of retarder, and 3.6 oz. of accelerator. The pump was set at "7," with the accelerator also being set at "7," using 50 p.s.i. air. The spot set at 45 minutes and the troweling resulted in a superior finish, lacking the undesirable cat whiskers, blisters, etc.

Still another variety of gypsum was tried, as can be seen in the following example:

Example XVII 25 lbs. of "neat" unfibered stabilized gypsum were combined with 7½ lbs. of 79–20 sand, 2 lbs. of aluminum stearate, 1½ lbs. of kaolin clay, and 13 lbs. of water. The pump and accelerator settings were at "5" and "6," respectively, using 50 p.s.i. air. The mixture was sprayed on at 1:27, the first troweling at 1:32, the second at 1:40, the third at 1:56, and the spot set at 2:15. The finish was good, with very few blisters, the artisan still being able to trowel the plaster 30 minutes after it was put on.

From the foregoing, we find that the most advantageous formulation includes a combination of the insoluble soap and a clay, with the preferred forms being aluminum or magnesium stearate and kaolin clay or old mine clay. Optimum results are obtained when the insoluble soap is present in an amount more than about 3 oz. per 100 lbs. of gypsum, i.e., weight percentages in excess of about 0.2% Weight percentages in the range of about 0.5 to about 1% of the insoluble soap yield the same superior results.

Examination of the completed trowel-finished panels, which are of substantial size (4' x 8') reveals that the additives do not interfere with the setting or crystallization of the gypsum into a hard, strong finish. Further, the setting is achieved rapidly, so that painting can be performed within the same day.

We also find that the optimum weight percentage of clay is between about 5% and 20% based on the weight of gypsum, and that with percentages lower than this, a grainy appearance results, while above this troweling becomes difficult. The preferred proportion of this range is about 6½% clay.

Similar tests with the soluble soaps such as potassium and ammonium stearate revealed completely unacceptable finishes characterized by extreme dry-out before proper setting could occur. On the other hand, calcium stearate performed almost as well as the aluminum stearate, there being somewhat superior plasticity of the mix when aluminum stearate was employed.

We prefer not to use zinc stearate as the insoluble soap since this, like lime, is somewhat toxic when used in a spray operation.

In practicing the invention, we have utilized the usual commercial adjuvants heretofore employed in spray plaster—retarder, accelerator, and inorganic salts such as potassium sulfate or Rochelle salt. The inorganic salts control the expansion of the plaster. The retarder and salts are often incorporated in the gypsum by the manufacturer, but the accelerator is advantageously added at the site—as in the above-mentioned Hobson Patent 3,035,940. Some commercial gypsum contain accelerator also, but the optimum practice of the invention contemplates a plastic having a "set" time of the order of four hours while in the spray machine hopper, but of the order of 40 minutes as it issues from the spray nozzle. Notwithstanding the presence of these adjuvants, practice of the inventive procedure without using at least the finely divided plasticizing agent results in unacceptable cat faces and like surface imperfections as a result of troweling.

As pointed out previously, the insoluble soap may be advantageously suspended on the gypsum plaster, or the sand-plaster mix if the latter is available commercially.

We also find that the so-called "second" troweling may be eliminated, with the attendant saving of time and labor, while still providing the superior troweled finish. Ordinarily, we find that the final troweling is best performed within about 40 minutes of plaster application.

It may be advantageous in certain instances where the plaster coat is relatively heavy along margins to employ a darbying or smoothing step prior to troweling. This is particularly effective in eliminating blisters along corner beads, margins and angles. After darbying or smoothing, the plaster coat is permitted to become firm to the touch, after which a thin additional layer of plaster is sprayed on—the thickness being just sufficient to provide fat for the troweling, say of the order of up to about $\frac{1}{32}''$. Ordinarily the second spray which we term a "sweeting" spray is relatively light, the total thickness of both sprays being of the order of $\frac{1}{16}''$. Although the spray applications could be designated "coats," we choose not to so name them since, in the plastering trade, a "coat" has come to be known as a layer which has proceeded to "set." In contrast to this, the initial layer here is merely firm to the touch, the gypsum plaster not being trowelable after set.

In contrast to this, the virtually exclusively used lime putty and plasters of the past can be troweled "through the set." In the practice of our invention, we do not rule out the presence of inconsequential quantities of lime. However, concern for the plasterer operating a spraying machine dictates that lime, if present, be restricted to well below toxic levels. Experience has shown that up to 4% lime based on gypsum may be sprayed in large rooms, ceilings, etc., without affecting the strength. However, from the standpoint of safety, we prefer to keep the level to below about 1% for general purpose construction which would include restricted areas like closets and bathrooms. The presence of such quantities of lime, up to 1%, does not appear to affect the strength of the finish coat so long as the requisite amounts of insoluble soap and clay are present.

In some instances, it is advantageous to alter the proportion of sand employed—as, for example, when the inventive plaster is used over a base coat rather than gypsum lath or gypsum board. In the case of application over a base coat, we employ somewhat lower percentages of sand (20–100% based on gypsum), which yields better trowel-ability. Optimally, 30 lbs. of sand are employed for each 100 lbs. of gypsum when applied over a base coat. Such sand may be of a 50/30 size. Also in the application over a base coat, it is advantageous to employ a higher proportion of neat cement—40 lbs. of neat cement with 10 lbs. of alpha gypsum; while over perforated liner gypsum lath, best results are obtained using 45 lbs. of alpha gypsum with 5 lbs. of neat cement.

While in the foregoing specification we have set down a detailed description of the invention for the purpose of explanation thereof, many variations in the details herein given may be made by those skilled in the art without departing from the spirit and scope of the invention.

We claim:

1. A non-toxic, substantially lime-free plastic characterized by superior trowelability consisting essentially of gypsum, from about 0.2% to about 1.0% based on the weight of gypsum of an insoluble soap, from about 5% to about 20% based on the weight of gypsum of clay, and sand, said insoluble soap being aluminum stearate.

2. The plaster of claim 1 in which the said soap constitutes about 0.5% of the weight of the gypsum.

3. The plaster of claim 1 in which the said gypsum is alpha gypsum.

4. A non-toxic, substantially lime-free plaster characterized by superior trowelability consisting essentially of gypsum, from about 0.2% to about 1.0% based on the weight of gypsum of an insoluble soap, from about 5% to about 20% based on the weight of gypsum of clay, and sand.

5. The plaster of claim 4 in which said insoluble soap is a fatty acid ester consisting of a fatty acid having from 8 to 22 carbon atoms and a multivalent cation, said multivalent cation being a member selected from the group consisting of calcium, magnesium and aluminum.

6. The plaster of claim 4 in which said clay is present in an amount from about 6% to about 12%.

7. A method of plastering, comprising combining with sand, water and gypsum from about 0.2% to about 1.0% by weight of an insoluble soap based on the weight of gypsum to provide a substantially lime-free, non-toxic plastic mixture, spraying the resultant mixture on a wall surface, and troweling the mixture to develop a plaster layer of the order of $\frac{1}{16}''$ thick having a compressive strength of at least about 1500 p.s.i. and having a surface characterized by the substantial absence of cat faces.

References Cited by the Examiner

UNITED STATES PATENTS

| | | | |
|---|---|---|---|
| 1,266,200 | 5/18 | Blumenberg | 106—110 |
| 1,967,959 | 7/34 | McAnamvy | 106—110 |
| 2,012,069 | 8/35 | Meade et al. | 106—110 |
| 2,197,566 | 4/40 | Denning | 106—111 |
| 2,785,988 | 3/57 | Lipkind et al. | 106—111 |
| 2,857,287 | 10/58 | Kampf | 106—109 |
| 3,035,940 | 5/62 | Hobson | 117—105.5 |
| 3,093,505 | 6/63 | Conway | 117—104 |

TOBIAS E. LEVOW, *Primary Examiner.*